United States Patent [19]
Saito

[11] Patent Number: 6,076,077
[45] Date of Patent: *Jun. 13, 2000

[54] DATA MANAGEMENT SYSTEM

[75] Inventor: Makoto Saito, Tokyo, Japan

[73] Assignee: Mitsubishi Corporation, Tokyo, Japan

[ * ] Notice: This patent is subject to a terminal disclaimer.

[21] Appl. No.: 08/846,661

[22] Filed: May 1, 1997

Related U.S. Application Data

[63] Continuation-in-part of application No. 08/549,271, Oct. 27, 1995, Pat. No. 5,646,999, and a continuation-in-part of application No. 08/733,504, Oct. 18, 1996, Pat. No. 5,974, 141.

[51] Int. Cl.[7] ............................... H04L 9/08; H04L 9/14; H04K 1/00

[52] U.S. Cl. .......................... 705/51; 380/201; 380/278; 380/279; 713/167; 713/193; 705/52; 705/59; 705/54; 705/57

[58] Field of Search .................................. 380/4, 49, 21, 380/201, 278, 279; 713/167, 193; 705/51, 52, 54, 57, 59

[56] References Cited

U.S. PATENT DOCUMENTS 5,465,299  11/1995  Matsumoto et al. ...................... 380/23

*Primary Examiner*—Pinchus M. Laufer
*Assistant Examiner*—Hrayr A. Sayadian
*Attorney, Agent, or Firm*—Armstrong, Westerman, Hattori, McLeland & Naughton

[57] ABSTRACT

A system for dealing in an original data content and an edited data content. A data content is handled as an object, and the data content is edited by editing a data content, functioning as an object, in accordance with an edit program. The edited data content is expressed by the original data content and the editing scenario which describes editing detail by the edit program. Only the encrypted editing scenario is dealt in. Upon receipt of the encrypted editing scenario, a user decrypts the encrypted editing scenario using a crypt key obtained from a key management center, and obtains the original data content from the database in accordance with the editing scenario and re-constitutes the edited data content. In case there is the one who wishes sale of the editing scenario, its utilization right is sold by auction.

4 Claims, 6 Drawing Sheets

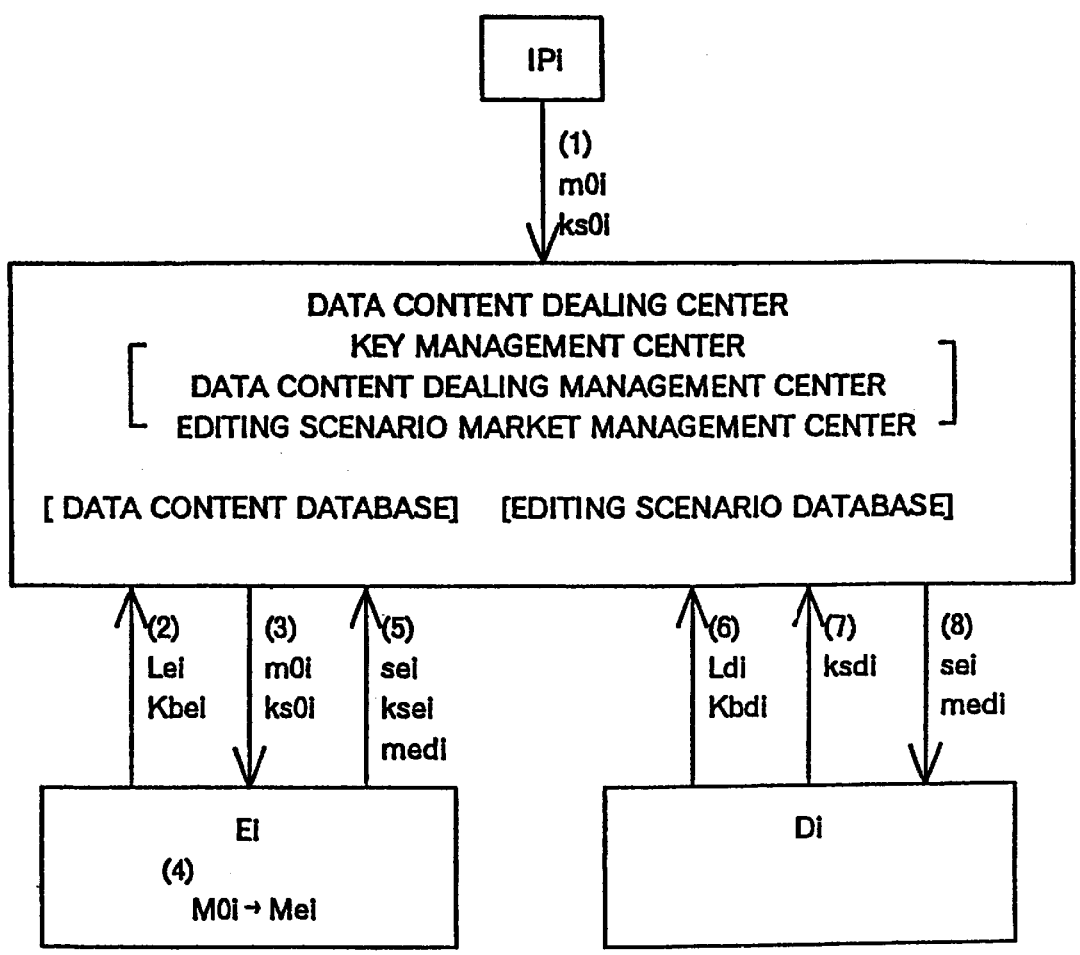

DATA MANAGEMENT SYSTEM

CROSS-REFERENCE TO RELATED APPLICATIONS

This is a continuation-in-part of prior U.S. patent application Ser. No. 08/549,271 filed on Oct. 27, 1995, now U.S. Pat. No. 5,646,999, and prior U.S. patent application Ser. No. 08/733,504 filed on Oct. 18, 1996, now U.S. Pat. No. 5,974,141 all of which are commonly assigned to the assignee of the present invention.

BACKGROUND OF THE INVENTION

1. Field of the Invention

The present invention relates to a system for managing copyrights in dealing in copyrighted digital data content, i.e., dealing in original digital data content and edited digital data content.

2. Background Art

Because analog data content is deteriorated in quality whenever storing, copying, editing, or transferring it, controlling copyrights associated with these operations has not been a serious problem. However, because digital data content is not deteriorated in quality after repeatedly storing, copying, editing, or transferring it, such controlling copyrights associated with these operation is a serious problem.

Because there has been hitherto no adequate method for controlling a copyright for digital data content, the copyright is handled by the copyright law or contracts. Even in the copyright law, compensation money for a digital-type sound- or picture-recorder is only systematized.

Use of a data content includes not only referring to its contents but also normally effectively using by storing, copying, or editing obtained data content by a user. Moreover, it is possible to transmit data content which is edited by a user to another person via on-line basis by a communication line or via off-line basis using a proper recording medium. Furthermore, it is possible to transmit the edited data content to the database to be registered as new data content. In such a case, the user who has edited the data content may also be an information provider.

Under these circumstances, how to deal in a copyright of data content in a database is a large problem. However, there has not been adequate copyright management means for solving the problem so far, particularly copyright management means completed for secondary utilization such as copying, editing, or transferring of the data content.

The inventor of the present invention proposed a system for managing a copyright by obtaining a permit key from a key control center via a public telephone line in Japanese Patent Laid-Open No. 46419/1994 (GB 2269302A) and Japanese Patent Laid-Open No. 141004/1994 (U.S. Pat. No. 5,504,933) and moreover, proposed an apparatus for managing the copyright in Japanese Patent Laid-Open No. 132916/1994 (GB 2272822A).

Moreover, a copyright management method for primary utilization of digital data content such as display (including process to sound) or storage including real-time transmission of the digital data content in a database system and secondary utilization of the digital data content such as copying, editing, or transferring of the digital data content by further developing the above invention is proposed in Japanese Patent Application No. 64889/1994 (U.S. patent application Ser. No. 08/416,037).

The database copyright management system of the above application in order to manage the copyright, either one or more of a program for managing the copyright, copyright information, and a copyright control message are used in addition to a use permit key corresponding to a requested use, and data content which has been transferred with encryption is decrypted to be used for viewing and editing, and the data content is encrypted again when used for storing, copying and transferring.

The copyright control message is displayed when utilization beyond the range of the user's request or authorized operation is found to give caution or warning to a user and the copyright management program performs monitoring and managing so that utilization beyond the range of the user's request or authorized operation is not performed.

The inventor also proposed in Japanese Patent Laid-open No. 185448/1996, EP publication No. EP 704785A2 (U.S. patent application Ser. No. 08/536,747) a system for specifically implementing a database copyright management system.

The above-mentioned system comprises a key management center that manages a crypt key and a copyright management center that manages the database copyright. According to this system, all of the data content delivered from a database is encrypted by a first crypt key, and a first user who wishes to uses data content directly from the database requests the key management center the key corresponding to the specific usage by presenting information on the first user to the center. In response to the primary usage request from the first user, the key management center transfers the information on the first user to the copyright management center. On receiving the information, the copyright management center transfers this information together with a copyright management program to the key control center. On receiving the copyright management program, the key control center transfers the first crypt key and a second crypt key K2 corresponding to the specific usage together with the copyright management program to the first user via a communication network. On receiving the first crypt key, the first user uses this key to decrypt the data content for usage. The user uses the second crypt key to encrypt and decrypt data content when subsequently storing, copying or transmitting the data content.

If data content is copied to an external record medium or transmitted without being stored, the first and second crypt keys are abandoned. If the first user wishes to use the data content again, the first and second crypt keys are re-delivered to the user from the copyright management center. The re-delivery of the second crypt key indicates a confirmation that the data content has been copied or transferred to a second user, and this is recorded in the copyright management center.

In requesting a secondary usage to the copyright management center, the second user presents the information on the first user and information on the original copyright to the copyright management center. The copyright management center transmits to the second user a permit key corresponding to the specific usage, together with a second crypt key (viewing permit key), a third crypt key (a permit key corresponding to the specific usage), and the copyright management program which have been encrypted.

On the other hand, it is widely practiced to establish LAN (Local Area Network) by connecting computers with each other in offices, organizations, companies, etc. Also, a plurality of networks are connected with each other, and Internet is now organized in global scale, by which a plurality of networks are utilized as if they are a single network.

In LAN used in an organization such as firms, secret information is often stored, which must not be disclosed to outsiders.

For this reason, it is necessary to arrange the secret information in such manner that only a specific group of users can gain access and use such information, and such access is generally placed under control to prevent leakage of secret information to outsiders.

There are roughly two methods to control the access: a method to control access with access permission, and a method to do it by encryption.

The method of access control by access permission is described in U.S. Pat. Nos. 5,173,939, 5,220,604, 5,224,163, 5,315,657, 5,414,772 and 5,438,508, in EP 506435, and in Japanese Patent Laid-Open 169540/1987.

The access control method based on encryption is disclosed in U.S. Pat. Nos. 4,736,422, 5,224,163, 5,400,403, 5,457,746, and 5,584,023, in EP 438154 and EP 506435, and in Japanese Patent Laid-Open 145923/1993. The access control method based on encryption and digital signature is described in U.S. Pat. Nos. 4,919,545 and 5,465,299.

Intranet is now being propagated, in which a plurality of LANs are connected with each other via Internet and these LANs are utilized as if they are a single LAN. In the intranet, information exchange is performed via Internet, which basically provides no guarantee for prevention of piracy, and information is encrypted to prevent the piracy when secret information is exchanged.

The prevention of information piracy during transmission by means of encryption is disclosed in U.S. Pat. Nos. 5,504,818 and 5,515,441, and the use of a plurality of crypt keys is described in U.S. Pat. Nos. 5,504,816, 5,353,351, 5,475,757, and 5,381,480. Also, performing re-encryption is described in U.S. Pat. No. 5,479,514.

When encrypting, management of crypt key including transfer and receipt of crypt key becomes an important issue. Generation of keys by IC card is disclosed in U.S. Pat. No. 5,577,121, and encryption/decryption by IC card is disclosed in U.S. Pat. Nos. 5,347,581 and 5,504,817.

Also, electronic watermark technique is described in EP 649074.

With recent development of computer network system, individual computers, used on stand-alone basis in the past, are connected together through the network system, and database system to commonly share the data is now propagated. Further, distributed object system has been proposed, in which application program or basic software called operating system as well as data is also commonly shared through the network.

In the distributed object system, both data content and software are supplied by a server as an object, which comprises program and data.

In the distributed object system, there are two systems, i.e. a system called object container, in which operating system, application program and data content are provided by a server and data content processing and data content storage are performed by a user terminal unit, which is an ordinary computer, and a system called server object, in which operating system, application program and data content are provided by a server, and data content processing is performed by a user terminal unit called network computer, while data content storage is carried out by a server. A system is further developed, in which data content processing is also performed by the server, and the user terminal unit is provided only with input/output function, and the whole system functions as a single computer.

Further, there is a method of so-called object oriented programming performing various processing by using "object" integrated with data content and program handling data content, instead of general form file consisting of data header and data body.

In object, a storing portion called as "slot" in an envelope called as "instance" accommodates data called as "instance variable". The slot is surrounded by one or more of procedures called as "method" for referring, processing, binding and so on, and the instance variable can be referred to or operated only via "method". This function is called as "encapsulation". Instruction from outside for make the "method" refer to or operate the instance variable is called as "message".

This means, in another view, the instance variable which is impossible to be referred to or operated without through "method" is protected by the "method". Then, this can be used for encrypting the "method" and allowing the instance variable to be referred to or operated only by "message" which can decrypt the encrypted "method".

In this case also, similarly to the case of data having general file form, since if entire "method" is encrypted, it is impossible to utilize "object", a part of the "method" is not encrypted.

Another form of the network system called "license network" as rental network system, is considered. In this system, an enterprise providing network base such as communication lines also provides the systems other than communication lines such as fee charging system, security system, copyright management system, certification system, etc. And a service enterprise utilizes these services and carries out network business as if it is his own system.

Then, basic encryption-related technique used in the present invention will be described below.

Crypt Key

Secret-key system is also called "common key system" because the same key is used for encryption and decryption, and because it is necessary to keep the key in secret, it is also called "secret-key system". Typical examples of encryption algorithm using secret-key are: DES (Data Encryption Standard) system of National Bureau of Standards, FEAL (Fast Encryption Algorithm) system of NTT, and MISTY system of Mitsubishi Electric Corp. In the embodiments described below, the secret-key is referred as "Ks".

In contrast, the public-key system is a cryptosystem using a public-key being made public and a private-key, which is maintained in secret to those other than the owner of the key. One key is used for encryption and the other key is used for decryption. Typical example is RSA public-key system. In this specification, the public-key is referred as "Kb", and the private-key is referred as "Kv".

Here, the operation to encrypt data content, a plain text material M to a cryptogram Cmks using a secret-key Ks is expressed as:

$$Cmks = E(M, Ks).$$

The operation to decrypt the cryptogram Cmks to the plain text data content M using a crypt key Ks is expressed as:

$$M = D(Cmks, Ks).$$

Also, the operation to encrypt the plain text data content M to a cryptogram Cmkb using a public key Kb is expressed as:

$$Cmkb = E(M, Kb).$$

The operation to decrypt the cryptogram Cmkb to the plain text data content M using a private-key Kv is expressed as:

$$M = D(Cmkv, Kv).$$

The operation to encrypt the plain text data content M to a cryptogram Cmkv using a private-key Kv is expressed as:

$$Cmkv = E(M, Kv),$$

and the operation to decrypt the cryptogram Cmkv to the plain text data content M using the public-key Kb is expressed as:

$$M = D(Cmkb, Kb).$$

The encryption technique is the means to exclude illegitimate use of data content, but perfect operation is not guaranteed. Thus, the possibility of illegitimate use of data content cannot be completely excluded.

On the other hand, electronic watermark technique cannot exclude the possibility of illegitimate use, but if illegitimate use is detected, it is possible to check the illegitimate use by verifying the content of electronic watermark, and there are a number of methods in this technique. These methods are described in Nikkei Electronics, No.683, 1997-2-24, pp.99–124, "'Digital watermark' to help stop to use illegal proprietary digital works in the multimedia age". Also, description is given on this technique by Walter Bender et al., "Introducing data-hiding technology to support digital watermark for protecting copyrights", IBM System Journal, vol. 35, Nos. 3 & 4, International Business Machines Corporation.

SUMMARY OF THE INVENTION

In the present application, it is proposed to provide a system for dealing in an original data content and an edited data content.

In the present application, a data content is handled as an object, and the data content, functioning as an object, is edited in accordance with a edit program. Therefore, the edited data content can be expressed by the original data content and the editing scenario, which describes the edit detail based on an edit program. As the original data content to be utilized, there are, in addition to the one stored in the database, those prepared originally by the data editor. The data content prepared by the data editor can also be handled in the same manner as the other data by storing it in the database. In this case, only the encrypted editing scenario is dealt in, and when the user obtains the encrypted editing scenario, the user decrypts the encrypted editing scenario by using a crypt key obtained from a key management center, and obtains the original data content from the database in accordance with the editing scenario and reconstitutes the edited data content.

In case there is the one who wishes sale of the editing scenario, its utilization right is sold by auction.

BRIEF DESCRIPTION OF THE DRAWINGS

FIG. 7 is an outlined block diagram of a system dealing in en editing scenario.

DETAILED DESCRIPTION OF THE INVENTION

Figure 1:
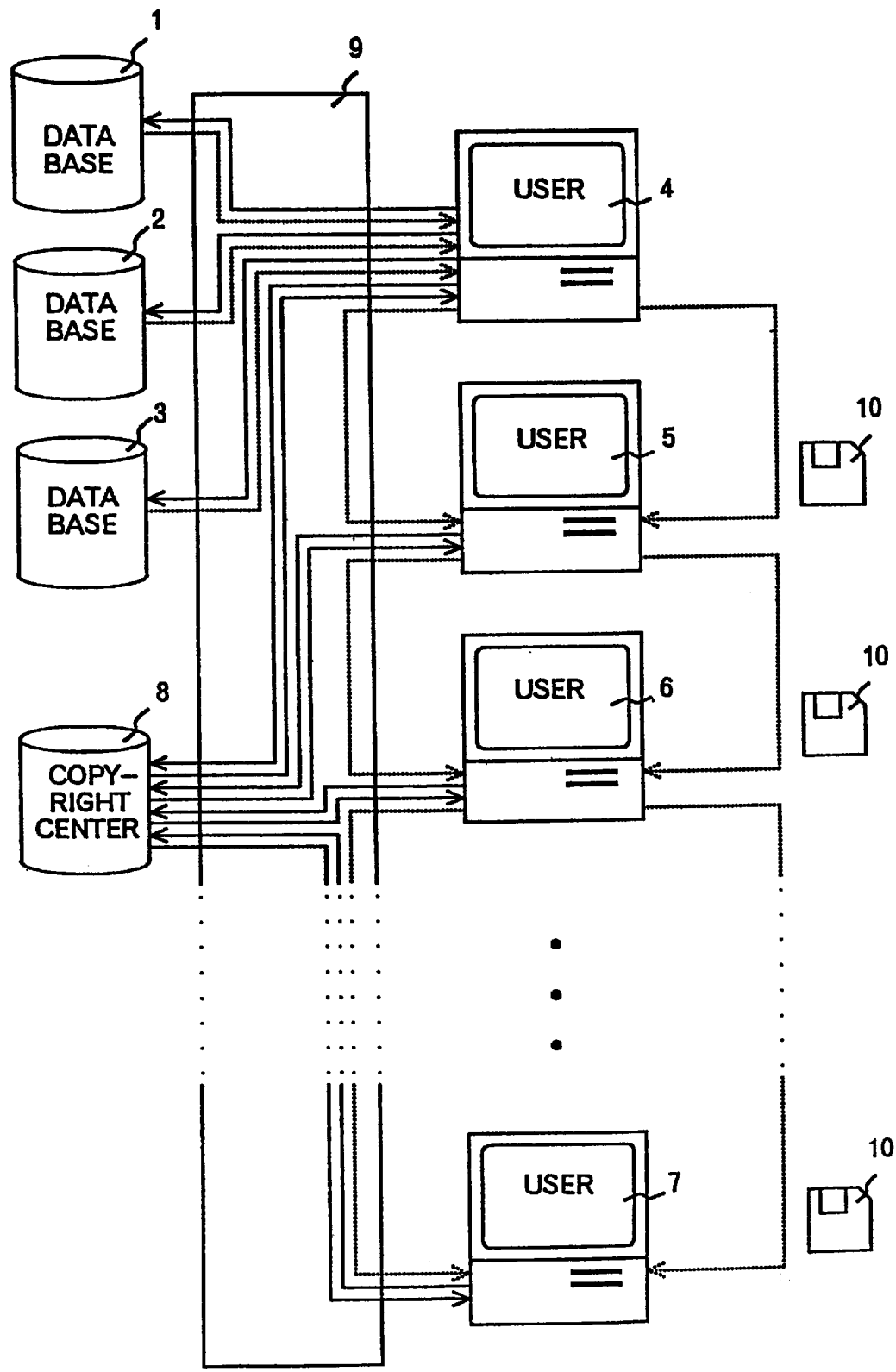
FIG. 1 is a block diagram of an embodiment of a data management system.

The present invention is a copyright management system for digital data. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

The preferred embodiments are described below referring to the accompanied drawings.

The edit processing of data content is performed by editing the original copyrighted data using an edit tool, which is an application program. The edited data content obtained by editing can be expressed by the utilized original data content, the information of the used edit tool and the editing process data. Specifically, in case the edit tool is available, it is possible to reproduce the edited data content by obtaining the original copyrighted data and the editing process data.

Description on editing digital data is given first.

Because digital data content is edited by using an edit program (edit tool) and thereby altering original data content, edited data content can be reproduced as the original data content, edit tool and editing process data content (editing scenario) are specified. In other words, unless the original data content, edit tool and the editing scenario are specified, it is impossible to reproduce the edited data content.

To produce new data content from single original data content, there are a case in which edited data content {A'} is obtained by altering original data content A; a case in which edited data content {A+X} is obtained by adding data content X to the original data content A by a user; a case in which edited data content {A"} is obtained by dividing the original data content A into original data content elements A1, A2, A3 . . . and changing the arrangement of the elements to such as A3, A2 and A1; and a case in which edited data content {A1+X1+A2+X2+A3+X3 . . . } is obtained by dividing the original data content A into original data content elements A1, A2, A3, . . . , also dividing the data content X of the user into X1, X2, X3, . . . and arranging these elements.

In these cases, alteration of original data content, change of original data content arrangement, combination of the original data content with user data content, and division of the original data content and combination of it with the user data content arise respectively a secondary copyright, which is necessary to be protected. The original copyright of the user, of course, exists in the data content X added by the user.

To produce new data content by combining a plurality of original data contents, there are a case in which edited data content {A+B+C . . . } is obtained by simply combining original data contents A, B, C, . . . ; a case in which edited data content such as {A+X} is obtained by adding data content X to the original data content A, B, C, . . . ; a case in which edited data content {A1+B1+C1+ . . . +A2+B2+C2+ . . . +A3+B3+C3+ . . . } is obtained by dividing the original data content A, B, C, . . . into original data content elements A1, A2, A3, . . . , B1, B2, B3, . . . , and C1, C2, C3, . . . , combining them, and changing their arrangements; and a case in which edited data content {A1+B1+C1+X1+ . . . +A2+B2+C2+X2+ . . . +A3+B3+C3+X3+ . . . } is obtained by dividing the original data content A, B, C, . . . into original data content elements A1, A2, A3, . . . , B1, B2, B3, . . . , and C1, C2, C, . . . , combining with the elements of user data content X1, X2, X3, . . . , and changing their arrangements.

Also in these cases, combination of a plurality of original data contents, combination of a plurality of original data contents with user data content, division of a plurality of original data contents and change of the arrangements, and combination of divided plurality of original data contents with the user data content arise respectively a secondary copyright, which is necessary to be protected. Also, the original copyright of the user, of course, exists in the data content X1, X2, X3, . . . added by the user.

Embodiment 1

The description of Embodiment 1 is given below referring to the drawing.

FIG. 1 shows a schematic view of a data copyrights management system in which a user edits one original copyrighted data and transfers it to a next user.

In the embodiment, reference numerals 1, 2, and 3 represent databases that store text data or binary, audio, and/or picture data constituting computer graphics screens or programs, which is not encrypted; 9 is a communication line such as a public telephone line provided by a communication company or a CATV line provided by a cable television company; 10 is a recording medium such as a flexible disk; 4 is a primary user terminal; 5 is a secondary user terminal; 6 is a tertiary user terminal; and 7 is an n-th user terminal device. Reference numeral 8 represents a copyright management center for managing the data copyright.

The databases 1, 2, and 3, copyright management center 8, primary user terminal 4, secondary user terminal 5, tertiary user terminal 6, and n-th user terminal 7 are connected to communication line 9. In FIG. 1, encrypted data content is transmitted via the path shown by a broken line, requests are transmitted from user terminal 4, 5, 6, or 7 to database 1, 2, or 3 and copyright management center 8 via the path shown by a solid line. The permit key, copyright management program, and crypt key corresponding to a specific usage are transmitted from database 1, 2, or 3 and copyright management center 8 to user terminal 4, 5, 6, or 7 via the path shown by an one-dot chain line.

The Embodiment 1 employs a first public-key Kb1, a first private-key Kv1 corresponding to the first public-key Kb1, a second public-key Kb2, and a second private-key Kv2 corresponding to the second public-key Kb2 that are prepared by a first user, and a first secret-key Ks1 and a second secret-key Ks2 prepared by the database. The database uses the first secret-key Ks1 to encrypt data content M:

$$Cmks1 = E(M, Ks1)$$

and further encrypts the first secret-key Ks1 by the first public-key Kb1:

$$Cks1kb1 = E(Ks1, Kb1)$$

and the second secret-key Ks2 by the second public-key Kb2:

$$Cks1kb2 = E(Ks2, Kb2).$$

The database then transmits these encrypted data content Cmks1 and the first and the second secret-keys Cks1kb1 and Ck2kb2 to the first user.

The first user decrypts the encrypted first secret-key Cks1kb1 using the first private-key Kv1:

$$Ks1 = D(Kv1, Cks1kb1),$$

and decrypts the encrypted data content Cmks1 by the decrypted first secret-key Ks1:

$$M = D(Ks1, Cmks1)$$

and use it. The user decrypts encrypted second secret-key Cks2kb2 by the second private-key Kv2:

$$Ks2 = D(Kv2, Cks2kb2),$$

which is subsequently used as a key for encrypting/decrypting of storing, copying, or transmitting data content.

If the first user copies data content obtained and then supplies it to secondary user 5, the data content does not involve the copyright of first user because no modifications have been made to the data content. If, however, first user produces new data content based on the data content obtained or using a means for combining the original data content with other data content, the new data content involves a secondary exploitation right for first user, and first user has the original copyright for this secondary work.

Similarly, if second user produces new data content based on the data content obtained from first user or combining with other data content, the new data content involves a secondary exploitation right for the second user, and the second user has the original copyright of this secondary work.

Databases 1, 2, and 3 store text data content or binary, digital audio, or digital picture data content constituting computer graphics screens or programs in unencrypted form. This data content is encrypted and supplied to the user terminal 4 via communication line 8 during a data content read operation in response to a request from first user terminal 4.

The method of managing data copyrights obtained from a database is described in Japanese Patent Application 1994-237673 (Japanese Patent Laid Open 1996-185448, U.S. patent application Ser. No. 08/536,747, EP 704785A2).

Figure 2:
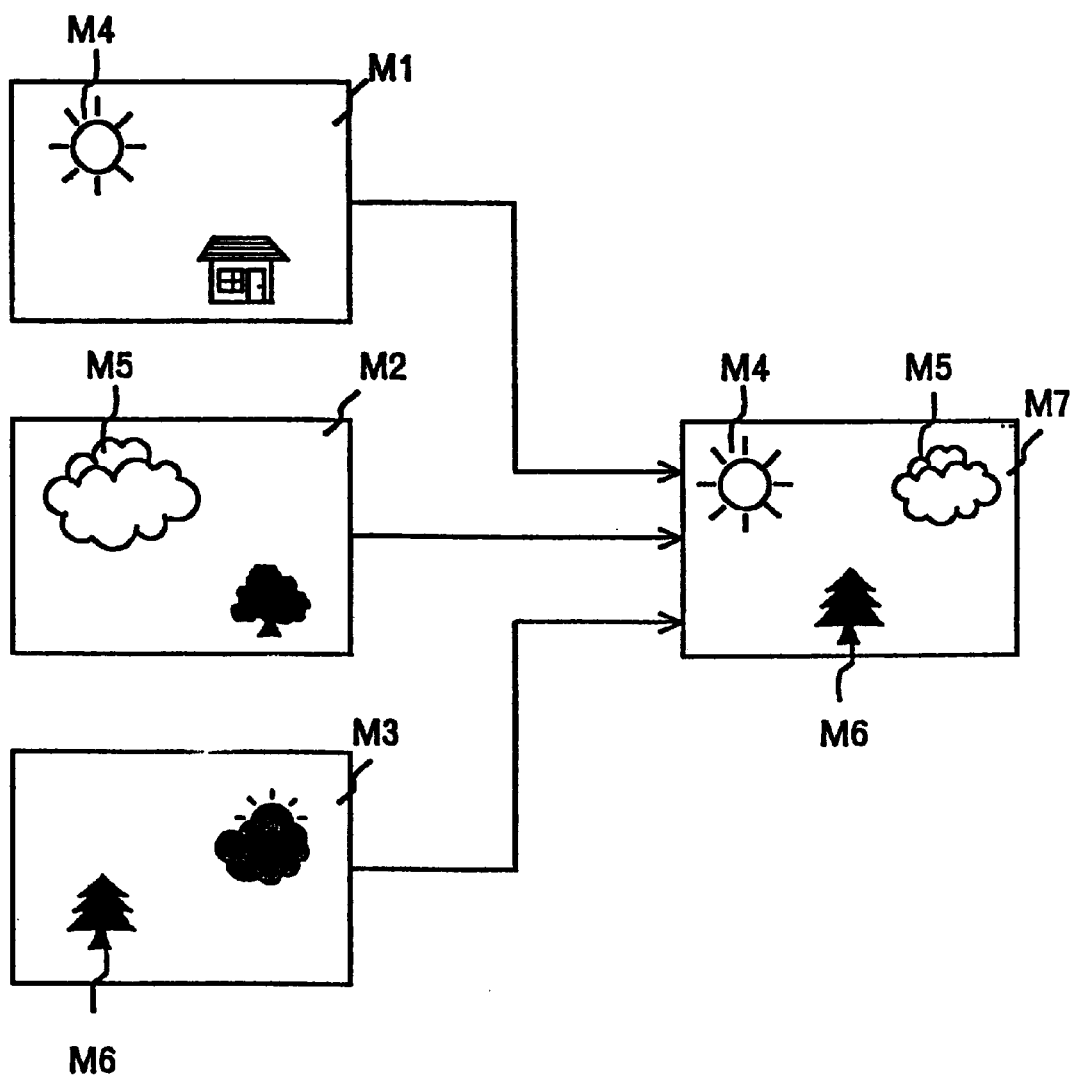
FIG. 2 illustrates an example of producing new data content using a plurality of data contents as objects.

As shown in FIG. 2, first user extracts parts M4, M5 and M6 constituting data content from a plurality of data contents M1, M2 and M3 obtained from one or more databases, and produces new data content M7 from these parts M4, M5 and M6.

First user supplies new data content M7 to second user; new data content M7 involves a secondary copyright associated with the editing of original data content M1, M2 and M3 as well as the original copyright for original data content M1, M2 and M3 from which parts M4, M5 and M6 produce new data content M7.

The original data content M1, M2 and M3 are encrypted using each of the second secret-keys Ks21, Ks22, Ks23 supplied with each of data content M1, M2 and M3 when used for operations other than display; i.e., store, edit, copy or transmit:

$$Cm1ks21 = E(M1, Ks21)$$

$$Cm2ks22 = E(M2, Ks22)$$

$$Cm3ks23 = E(M3, Ks23).$$

The data content parts M4, M5 and M6, of original data content are also encrypted using each of the second secret-keys Ks21, Ks22, Ks23 supplied with each of the original data content when used for operations other than display:

$$Cm4ks21=E(M4,Ks21)$$

$$Cm5ks22=E(M5,Ks22)$$

$$Cm6ks23=E(M6,Ks23).$$

First user who has edited the data content provides a digital signature for edit program Pe using first Private-key Kv1:

$$Spe=D(Pe,Kv1)$$

and supplies encrypted original data content parts Cm4$ks$21, Cm5$ks$22 and Cm6$ks$23 to second user together with the edit program Pe with the digital signature, via communication line 9 or by storing into the recording medium 10.

Upon receipt of the encrypted original data content parts Cm4$ks$21, Cm5$ks$22 and Cm6$ks$23, and the edit program Pe, second user requests second secret-keys Ks21, Ks22, Ks23 for decryption of the encrypted original data content parts Cm4$ks$21, Cm5$ks$22 and Cm6$ks$23 by presenting the edit program Pe with the digital signature, to the copyright management center 8.

Data copyright management center identifies first user from the presented digital signature in the edit program Pe, using first public-key Kb1:

$$Pe=E(Spe,Kb1),$$

and determines if first user is a valid user to use the original data content to which the second secret-keys Ks21, Ks22, Ks23 correspond. If first user is the valid user, the center transmits the second secret-keys Ks21, Ks22, Ks23 to second user. Otherwise, it does not transmit the second secret-keys Ks21, Ks22, Ks23 to second user.

The digital signature Spe presented to the copyright management center is registered in the center as a valid procedure for authorizing the first user being a secondary copyright owner.

While the above data content edition of original data content can be performed by using an edit program corresponding to the original data content, by handling the original data content as object-oriented software, it is possible to facilitate further editing of data content and manage more preferably copyrights of data content.

Moreover, by adopting agent-oriented software, a user can synthesize data content with little labor.

The agent-oriented software, unlike the conventional one, is a program having autonomy, flexibility and cooperativeness, which is able to meet a user's request with its characteristics of autonomy, flexibility and cooperativeness in accordance with only a general instruction of the user without specifically giving every operation instruction to the software.

By incorporating the agent program into a basic system of a data copyright management system so that the database utilization of a user is monitored, and it is arranged that information including data utilization condition and charging is collected at the database or the copyright management center, using metering function placed in user terminal, and thus, it is possible to know the database utilization condition of the user at the database side or the copyright management center side and achieve more accurate copyright management. These agent program and its data are also necessary to be protected in copyrights, and therefore, are encrypted like original data content.

The data on copyrights can be handled in the computer programming or processing as "object" integrated of program and data content.

Embodiment 2

Figure 3:
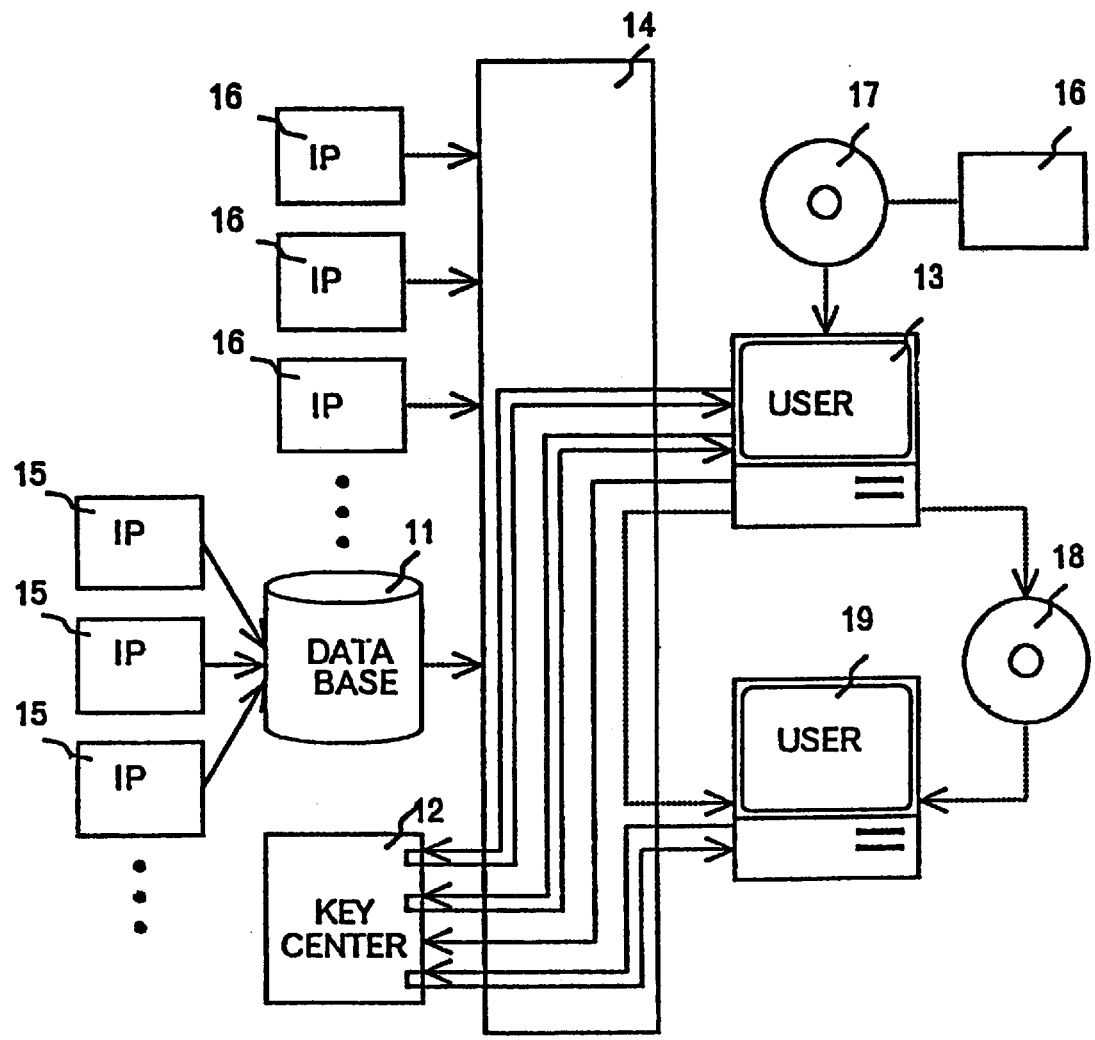
FIG. 3 is a block diagram of another embodiment of a data management system.

Embodiment 2 is described referring to FIG. 3. This embodiment uses first secret-key Ks1, second secret-key Ks2, third secret-key Ks3, plaintext original copyright label Lc0 and plaintext copyright management program Pc.

The data copyright management system shown in FIG. 3 comprises database 11, key control center 12, users 13, 13, 13 . . . and the network 14 that connects these entities. Database 11 receives data content from information providers(IP) 15, 15, 15. . . . However, in some cases, data content is supplied directly to users 13 from information providers 16, 16, 16 . . . via communication line 14 without database 11 intervening.

The data content used in the invention is the object comprising combined program and data content. Data is supplied from information providers 15, 15, 15 . . . to database 11 and to primary users 13. However, in some cases, data content is supplied from information providers 16, 16, 16 . . . via communication line 14 or via information record medium 17 such as CD-ROM or the like directly to primary users 13 without database 11 intervening.

The solid line, broken line and one-dot chain line in this FIG. 3 show the path for data content and requests for crypt keys, path of encrypted data content and path of crypt keys, respectively.

Primary users 13 are not merely users but can be information providers 15 or 16 that provide new data content (secondary copyrighted data) by combining or revising a plurality of obtained original data content.

In the data copyrights management system, the original data content provided by each of information providers 15 and 16 has been encrypted to protect the copyright. Therefore, the use of the encrypted original data content obtained by first user 13 needs to be decrypted. All of the crypt keys for the decryption are deposited in key control center 12 to be controlled by the center.

Each information provider 15 or 16 can adopt freely any cryptosystem. However, the cryptosystem described later and used after secondary utilization of data content is limited to one adopted by key control center 12.

In this system, plaintext original data content M0 is encrypted by first secret-key Ks1:

$$Cm0ks1=E(M0,Ks1),$$

and is provided to primary users 13 from information provider 15 via data content database 11 and communication line 14, or from information provider 16 via communication line 14, or via information recording medium 17 such as CD-ROM, together with original copyright label Lc0.

Original plaintext copyright label Lc0 is attached to encrypted original data content Cm0$ks$1 provided for primary users 13, and is used for obtaining primary use permit keys, etc. Namely, encrypted original data content Cm0$ks$1 includes plaintext original copyright label Lc0 and encrypted original data content Cm0$ks$1. The name of application programs in use, outlined explanation, fees and charging method are entered into plaintext original copyright label Lc0 in addition to general information including the name of original creator, title name and creation date. The number of a crypt key is also entered if necessary. Digital signature by original creator added to plaintext original copyright label Lc0 prevents false copyright claiming.

Primary users 13 who require use of encrypted original data content Cm0$ks$1 make a request to key control center 12 via communication line 14 for distributing primary use permit keys K1 indicating original copyright label Lc0.

Key control center 12 that has identified secret-key as first secret-key Ks1 to be distributed, by original copyright label Lc0 indicated, distributes this identified first secret-key Ks1 to primary users 13 via network system 14. Upon receipt of distributed primary use permit key K1, the devices of primary users 13 are turned to the copyright management mode, and the primary copyrighted data content becomes available for use to primary users 13.

On the other hand, key control center 12 charges as well as grasps the use condition of original data content and of the database used by primary users 13.

Primary users 13 decrypt encrypted primary copyrighted data content Cm0ks1 using first secret-key Ks1:

$$M0=D(Cm0ks1,Ks1),$$

and use it.

When decrypted original data content M0 is stored in primary users 13 devices, it is encrypted again by first secret-key Ks1

$$Cm0ks1=E(M0,Ks1)$$

and re-encrypted original data content Cm0ks1 is stored.

For repeated use of re-encrypted original data content Cm0ks1, repeated decryption and encryption are carried out using first secret-key Ks1.

Primary users 13 who require to edit original copyrighted data content M0 make a request to key control center 12 for distributing second secret-key Ks2 via communication line 14. Key control center 12 that receives the request for distributing second secret-key Ks2 provides primary users 13 via communication line 14. Primary users 13 that have received second secret-key Ks2 edit original data content M0 and obtain halfway edited data content M0'.

When halfway edited data content M0' is stored in users 13 devices, it is encrypted by second secret-key Ks2:

$$Cm0'ks2=E(M0',Ks2).$$

When the edit is finally completed, primary users 13 prepare third secret-key Ks3 in order to execute the secondary copyright with reference to the data content edition concerning final editorial data content M1, and register third secret-key Ks3 into key control center 12. The key control center 12 also may prepare third secret-key Ks3 and distribute it in response to a request from primary users 13.

When primary users 13 copy editorial data content M1 into external recording medium 18 or transfer it via communication line 14, they encrypt editorial data content using third secret-key Ks3:

$$Cm1ks3=E(Ks3,M1),$$

and provide it for secondary users 19.

Secondary users 19 who desire to use provided encrypted editorial data content Cm1ks3 request key control center 12 for distributing third secret-key Ks3 via communication line 14. Key control center 12 that has received the request for distributing third secret-keys Ks3 from secondary users 19 distributes third secret-key Ks3 to secondary users 19 via communication line 14.

Secondary users 19 who have received third secret-keys Ks3 decrypt encrypted editorial data content Cm1ks3 using third secret-key Ks3:

$$M1=D(Ks3,Cm1ks3)$$

and use it.

When using encrypted data content Cm1ks3 again, decryption and encryption are carried out using third secret-key Ks3 also in this case.

Embodiment 3

Figure 4:
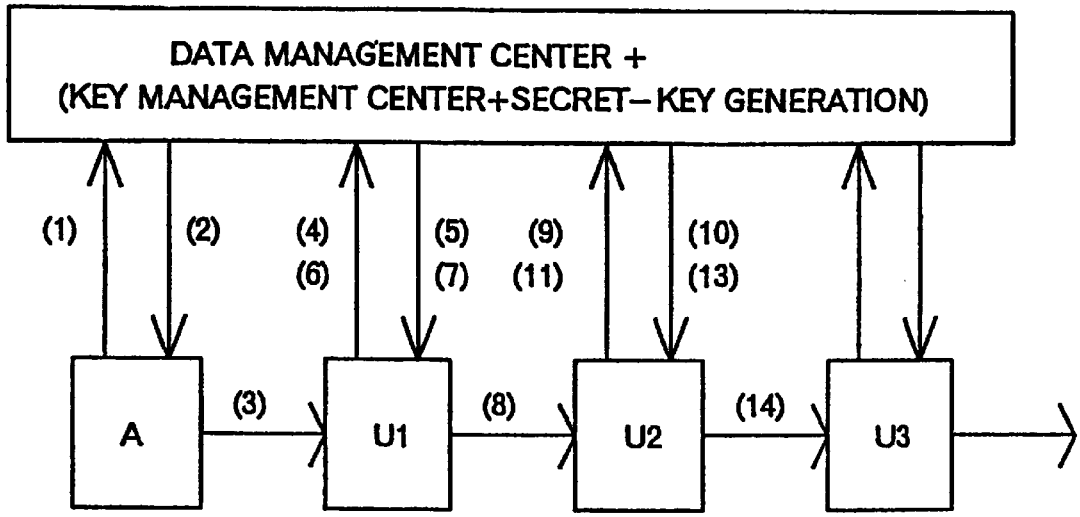
FIG. 4 is an outlined block diagram of an embodiment of a data content dealing system.

Embodiment 3 in which a user edits one original copyrighted data content and transfers it to a next user, is described as below referring to FIG. 4. This embodiment uses "user label", "copyright label" and "edit label" in order to protect data content copyrights and execute the copyrights. Information of the label owner is described in the user label; information relating copyrighted data content is described in the copyright label; and contains information of the edit tool and editing process data (editing scenario) are described in the edit label, which may be described edit tool (edit program) instead of edit tool information.

The user label is generated by the data management center according to the information of the user when the user joins the system. The copyright label is generated by the data management center when the author of the data content presents the content to the data management center. The edit label is generated by the data management center, when the user who has edited the data content presents the user label and the editing scenario to the data management center. These are transferred to each label owner and are stored at the data management center.

(1) The original author A presents the original copyright label Lc0 and requests the data management center to distribute original secret-key Ks0. The original author may transfer or deposit the original data content to an information provider or to database so that the information provider or the database can play a role of the original author.

It is also possible that the original author A stores the original secret-key Ks0 and encrypts the original data content M0 without depending on the data management center, while the original secret-key Ks0 must be stored at the data management center to utilize the original data content M0 by the user (data content user).

(2) When requested to distribute the original secret-key Ks0, the data management center encrypts the original secret-key Ks0 corresponding to the original copyright label Lc0 using public-key Kb0 of the original author A:

$$Cks0kb0=E(Ks0,Kb0)$$

and sends the encrypted original secret-key Cks0kba together with the original copyright label Lc0 to the original author A.

In this case, the data management center performs one-way hash to the original copyright label Lc0 using algorithm such as MD 5, for example, to 16-byte data content amount, prepares an original copyright label fingerprint F0, and sends it to the original author A. This electronic fingerprint is prepared on each of the original data content and edited data content each time the original data content is edited and edited data content is obtained and is transferred, together with the data content.

(3) When the encrypted original secret-key Cks0kb0 is distributed, the original author A decrypts the encrypted original secret-key Cks0kb0 using private-key Kv0 of the original author A:

$$Ks0=D(Cks0kb0,Kv0),$$

encrypts the original data content M0 using the decrypted original secret-key Ks0:

$$Cm0ks0=E(M0,Ks0)$$

and transfers the encrypted original data content Cm0ks0, the original copyright label Lc0 and the original copyright label fingerprint F0 to the first user U1.

(4) When the encrypted original data content Cm0ks0, the original copyright label Lc0 and the original copyright label fingerprint F0 are transferred, the first user U1 presents the original copyright label Lc0, the original copyright label fingerprint F0 and first user label Lu1 and requests the data management center to distribute the original secret-key Ks0.

(5) When requested to distribute the original secret-key ks0, the data management center confirms validity of the presented original copyright label Lc0 using the original copyright label fingerprint F0 and registers the first user label Lu1. At the same time, the original secret-key Ks0 corresponding to the original copyright label Lc0 is encrypted using public-key Kb1 of the first user U1:

$$Cks0kb1=E(Ks0,Kb1)$$

and the encrypted original secret-key Cks0kb1 is distributed to the first user U1.

(6) When the encrypted original secret-key Cks0kb1 is distributed, the first user U1 decrypts the encrypted original secret-key Cks0kb1 using private-key Kv1 of the first user U1:

$$Ks0=D(Cks0kb1,Kv1),$$

decrypts the encrypted original data content Cm0ks0 using the decrypted original secret-key Ks0:

$$M0=D(Cm0ks0,Ks0),$$

and edits the decrypted original data content M0 using the edit tool and obtains edited data content Me1.

The edited data content Me1 thus obtained contains copyright of the first user, who edited the data content, and also copyright of the original author who prepared the original data content.

The copyright of the original author relating to the original data content M0 can be protected by the original copyright label Lc0 which has been registered, original copyright label fingerprint F0 and the original secret-key Ks0 corresponding to the original copyright label Lc0 and also by the first user label Lu1 and the first secret-key Ks1 corresponding to the first user label Lu1. However, because no key for encrypting the edited data content Me1 is available, the secondary copyright of the first user relating to the edited data content Me1 is not yet protected.

(7) To protect the secondary copyright of the first user relating to the edited data content Me1, label of the first user, who is the author of the edited data content, and its electronic fingerprinting are used in this embodiment.

As already described, the edited data content can be expressed by data content of the utilized original data content, information of the used edit tool and the editing scenario (editing process data content). Accordingly, these informations and editing scenario are entered in the first user label, i.e. the first edit label Le1.

Further, to protect secondary exploitation right as the secondary copyright in subsequent distribution process, the user U1 presents the first edit label Le1 to the data management center so that the secondary exploitation right of the user U1 is registered.

(8) When the first edit label Le1 is presented, the data management center confirms validity of the presented original copyright label Lc0 using the original copyright label fingerprint F0 and registers the first edit label Le1. At the same time, the electronic fingerprint F1 of the first edit label Le1 is prepared, and first edit secret-key Kse1 corresponding to the first edit label Le1 is encrypted by public-key Kb1 of the first user U1 at the data management center:

$$Ckse1kb1=E(Kse1,Kb1),$$

and the encrypted first edit secret-key Ckse1kb1 is distributed to the first user U1 together with the electronic fingerprint Fe1 of the first edit label Le1.

(9) When the encrypted first edit secret-key Ckse1kb1 and the electronic fingerprint Fe1 of the first edit label Le1 are distributed, the first user U1 decrypts the encrypted first edit secret-key Ckse1kb1 using private-key Kv1 of the first user U1:

$$Kse1=D(Ckse1kb1,Kv1),$$

encrypts the first edited data content Me1 using the decrypted first edit secret-key Kse1:

$$Cme1kse1=E(Me1,Kse1)$$

and transfers the encrypted first edited data content Cme1kse1 to the second user U2 together with the first edit label Le1, and the electronic fingerprint Fe1 of the first edit label Le1.

Then, the same operation is repeated.

Each user may put digital signature which one-way hash value of the user's label is encrypted using user's private-key on the user's label to be presented to the data management center. Then, the data management center decrypts the encrypted one-way hash value using the user's public-key, calculates the one-way hash value of the label and compares the two one-way hash values in order to verify validity of each user's label.

In this embodiment, only the first edit label Le1 and the electronic fingerprint Fe1 of the first edit label Le1 are transferred together with the encrypted first edited data content Cme1kse1 when edited data content transfer, while it is possible to arrange in such manner that the other labels and electronic fingerprints can be simultaneously transferred.

In the editing by utilizing a plurality of data content as shown in FIG. 2, operation is complicated because there are a large numbers of data content and it can be carried out as in the editing process using a single data content. Description is not given here to avoid lengthy explanation.

In the systems described above, the data content is encrypted using secret-key, and the secret-key for its decryption and secret-key for re-encryption used for storage, copying and transfer are distributed by the data management center based on the user label presented by the user.

Embodiment 4

In case of distributed object system represented by license network system, the use of network computer to perform only input/output of data content and data content processing and not provided with data content storage unit is adopted instead of conventional type computer, which possesses data content storage unit of large capacity.

Further, the use of a network computer similar to a terminal unit of large size computer, having only input/output function of data content and not provided with data content processing unit is also considered.

This network computer does not have data content storage unit and cannot store or copy the data content.

Next, description is given on an embodiment, which can also be applied to a network computer not provided with data content storage unit and used in the distributed object system. It is needless to say that this embodiment is also applicable to an ordinary computer provided with data content storage unit.

To protect data content copyright, it is necessary to use some sort of encryption technique to restrict unauthorized utilization of the data content.

In the Embodiment 3 described above, to protect copyright in a system for an ordinary computer having data storage unit, encrypted data content and labels not encrypted as clues to utilize the data content are used.

In contrast, in a system for a network computer, which has only the function of the above-mentioned terminal unit, the data content is not stored, copied or transferred, and there is no need to encrypt the data content.

As already explained, the editing of data content is performed by modifying the original data content using the edit tool, and data content of the edited data content thus obtained can be expressed by the utilized original data content, information of the used edit tool and the editing scenario.

In case edited data content is produced by utilizing the data content in the database existing on the distributed object system, the edited data content can be reproduced by specifying the utilized database, the used original data content, information of the used edit tool and the editing scenario. The same applies to the case where a plurality of data content obtained from a single database or a plurality of databases are utilized.

Figure 5:
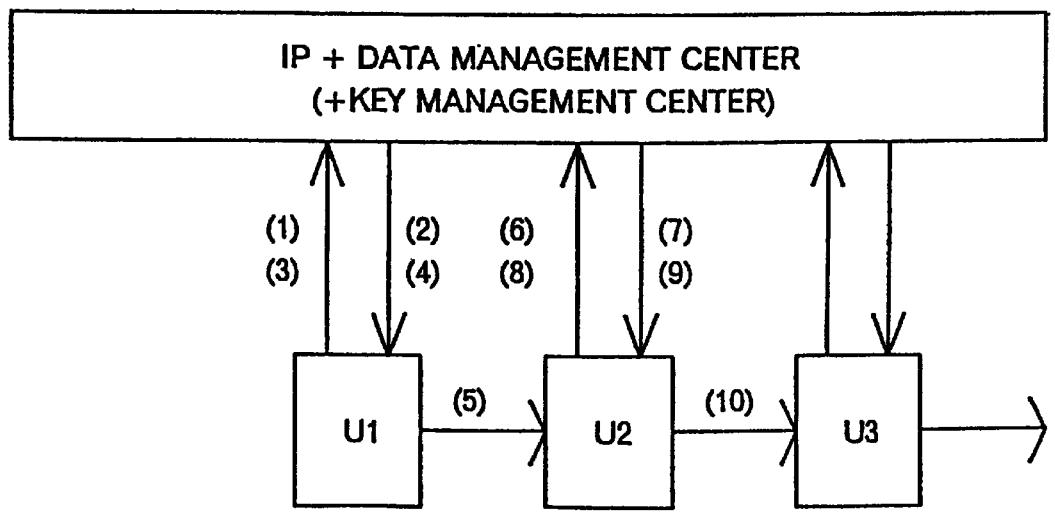
FIG. 5 is an outlined block diagram of another embodiment of a data content dealing system.

Description is given below on Embodiment 4 referring to FIG. 5.

In this embodiment, the original copyright owner and the information provider holding the data content are discriminated from the user who does not hold data content, and are arranged on the network side with the data management center and the like.

In the system of this embodiment, public-key and private-key are used. If original data content is transferred to a user, the original data content is encrypted by using a secret-key or a public-key of transferred destination for the purpose of security.

The first user U1 searches the data content and collects necessary data content utilizing the network, broadcasting or recording medium. The collected data content is simply stored temporarily on memory of the user U1. Even when data content storage unit such as a hard disk drive is included in the device of the user U1, the data content is not stored in the data content storage unit.

In order that the data content is not stored, when there is an attempt to store it, inhibition of storage of the data content is performed by destroying the data content on memory, changing data content header on memory, turning the data content to one-way hash value, changing file name to non-storable file name, etc.

While it is possible to inhibit the storage by data content storage inhibition program, which is incorporated in the program of the data content having object structure, higher reliability is accomplished if the storage inhibition is performed by an operating system, which is related to the entire system or to the user's device.

Description is given on a case where a plurality of data content are utilized in the fourth embodiment.

(1)(2) The first user U1 presents the first user label Lu1 to the data management center, collects the original data content M0$i$ (i=1, 2, 3, . . . ) from data content library of the information provider IP in the system and obtains a edit tool Pe. In this case, the original data content M0$i$ and the edit tool Pe are encrypted using public-key Kb1 of the first user U1:

$$Cm0ikb1=E(M0i,Kb1)$$

$$Cpekb1=E(Pe,Kb1)$$

and the encrypted original data content Cm0$ikb$1 and the encrypted edit tool Cpe$kb$1 are distributed to the first user U1.

In this case, the first user label Lu1 is referred, and utilizing conditions of the original data content M0$i$ and the edit tool Pe are recorded at the data management center and are utilized for charging of a fee.

(3) When the encrypted original data content Cm0$ikb$1 and the encrypted edit tool Cpe$kb$1 are distributed, the first user U1 decrypts the distributed encrypted original data content Cm0$ikb$1 and the encrypted edit tool Cpe$kb$1 using private-key Kv1 of the first user U1:

$$M0i=D(Cm0ikb1,Kv1)$$

$$Pe=D(Cpekb1,Kv1).$$

Using the decrypted edit tool Pe, the decrypted original data content M0$i$ is edited, and a first edited data content M1$i$ (i=1, 2, 3, . . . ) is obtained.

(4) Obtaining the first edited data content M1$i$, the first user U1 encrypts a first scenario S1$i$, which is the editing process data content for the first edited data content M1$i$, using public-key Kbc of the data management center:

$$Cs1ikbc=E(S1i,Kbc)$$

and presents the encrypted first scenario Cs1$ikbc$ together with the first user label Lu1 to the data management center, so that secondary copyright of the user U1 is registered.

(5) When the encrypted first scenario Cs1$ikbc$ is presented, the data management center decrypts the encrypted first scenario Cs1$ikbc$ using private-key Kvc of the data management center:

$$S1i=D(Cs1ikbc,Kvc),$$

prepares a first edit label Le1 based on the presented user label of the first user U1 and the decrypted first scenario S1$i$, stores it in the data management center, encrypts the first edit label Le1 using public-key Kb1 of the first user U1:

$$Cle1kb1=E(Lei,Kb1),$$

and transfers the encrypted first edit label Cle1$kb$1 to the first user U1.

(6) When the encrypted first edit label Cle1$kb$1 is transferred, the first user U1 decrypts the encrypted first edit label Cle1$kb$1 using private-key Kv1 of the first user U1:

$$Le1=D(Cle1kb1,Kv1),$$

encrypts the decrypted first edit label Le1 using public-key Kb2 of the second user U2:

$$Cle1kb2=E(Le1,Kb2)$$

and transfers the encrypted first edit label Cle1$kb2$ to the second user U2, but the first edited data content M1$i$ or the encrypted first edited data content is not transferred to the second user U2.

When the computer of the first user U1 is provided with a data content storage unit, there is possibility that the collected data content or the edited data content may be stored in the storage unit, however, storage inhibition as described above is carried out to exclude storage, copying and transfer.

In this case, it is possible, instead of the encrypted first edit label Cle1$kb2$, to use electronic fingerprint F1, which is obtained by turning the first edit label to one-way hash value. In so doing, it is possible to perform simplified transfer of the edit label by telephone voice.

(7) When the encrypted first edit label Cle1$kb2$ is transferred, the second user U2 decrypts the transferred encrypted first edit label Cle1$kb2$ using the private-key Kv2 of the second user U2:

$$Le1=D(Cle1kb2,Kv2),$$

encrypts the first edit label Le1 using the private-Key Kv2 of the second user U2:

$$Cle1kv2=E(Le1,Kv2)$$

and presents the encrypted first edit label Cle1$kv2$ together with the second user label Lu2 to the data management center.

(8) When the encrypted first edit label Cle1$kv2$ and the second user label Lu2 are presented, the data management center decrypts the presented encrypted first edit label Cle1$kv2$ using public-key Kb2 of the second user U2:

$$Le1=D(Cle1kv2,Kb2),$$

collects the original data content M0$i$ shown on the decrypted first edit label Le1, edits the original data content M0$i$ using the edit tool Pe based on the first scenario S1$i$ described on the first edit label Le1, and reproduces the first edited data content M1$i$.

When the first edited data content M1$i$ is reproduced, the data management center encrypts the first edited data content M1$i$ and the edit tool Pe using the public-key Kb2 of the second user U2:

$$Cm1ikb2=E(M1i,Kb2)$$

$$Cpekb2=E(Pe,Kb2)$$

and transfers the encrypted first edited data content Cm1$ikb2$ and the encrypted edit tool Cpe$kb2$ to the second user U2.

(9) When the encrypted first edited data content Cm1$ikb2$ and the encrypted edit tool Cpe$kb2$ are distributed, the second user U2 decrypts the distributed encrypted first edited data content Cm1$ikb2$ and the encrypted edit tool Cpe$kb2$ using private-key Kv2 of the second user U2:

$$M1i=D(Cm1ikb2,Kv2)$$

$$Pe=D(Cpekb2,Kv2)$$

and edits the decrypted first edited data content M1$i$ using the decrypted edit tool Pe, and the second edited data content M2$i$ (i=1, 2, 3, . . . ) is obtained.

(10) When the second edited data content M2$i$ is obtained, the second user U2 encrypts the second scenario S2$i$, which is editing process data content of the second edited data content M2$i$, using the public-key Kbc of the data management center:

$$Cs2ikbc=E(S2i,Kbc)$$

and presents the encrypted second scenario Cs2$ikbc$ together with the second user label Lu2 to the data management center.

(11) When the encrypted second scenario Cs2$ikbc$ is presented, the data management center decrypts the encrypted second scenario Cs2$ikbc$ using the private-key Kvc of the data management center:

$$S2i=D(Cs2ikbc,Kvc),$$

prepares a second edit label Le2 based on the presented user label of the second user and the decrypted second scenario S2$i$, stores it in the data content management center, encrypts the second edit label Le2 using public-key Kb2 of the second user U2:

$$Cle2kb2=E(Le2,Kb2)$$

and transfers the encrypted second edit label Cle2$kb2$ to the second user U2.

(12) When the encrypted second edit label Cle2$kb2$ is transferred, the second user U2 decrypts the encrypted second edit label Cle2$kb2$ using private-key Kv2 of the second user U2:

$$Le2=D(Cle2kb2,Kv2),$$

encrypts the decrypted second edit label Le2 using public-key Kb3 of the third user U3:

$$Cle2kb3=E(Le2,Kb3)$$

and transfers the encrypted second edit label Cle2$kb3$ to the third user U3.

Then, the same operation is repeated.

In the Embodiment 4 using this distributed object system, the data content is not stored by the user, but it is stored only in the database. On the other hand, the user controls and stores only the information relating to user and editing, i.e. the edit label having information of the utilized original data content and the used edit tool, the editing scenario and the information of the user who has edited. Only this edit label is encrypted and transferred between the users. Therefore, the data content is not stored, copied or transferred.

It is also possible to simultaneously provide two systems so that the two systems can be adequately selected and utilized, i.e. a system where the keys for re-encryption is distributed at the same time as the keys for decryption, and a system where keys for re-encryption are separately distributed from those for decryption.

Embodiment 5

Figure 6:
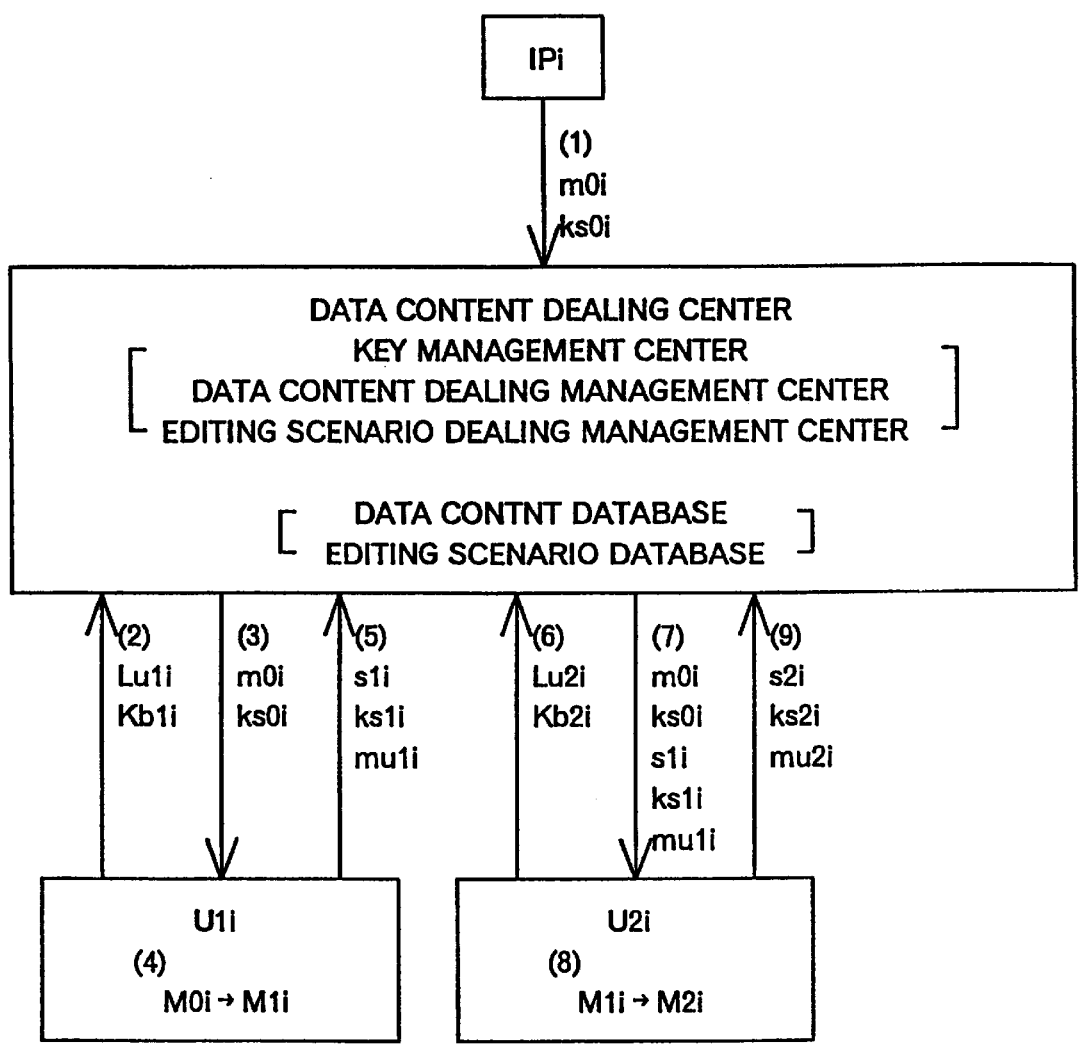
FIG. 6 is an outlined block diagram of yet another embodiment of a data content dealing system.

Description is given on an embodiment of a data content dealing system for dealing in an original data content and an edited data content obtained by editing the original data content by the user, referring to FIG. 6.

The original data content handled in this system is an object, and the edited data content is expressed as the original data content object linked by an editing scenario. Therefore, only the editing scenario is dealt in. Upon receipt of the editing scenario, the user collects and links the original data content used in accordance with the editing scenario and reproduces the edited data content. In this case, the original data content may be collected or linked by the user himself, but the burden on the user may be reduced if it is performed in the system side or by using an agent program.

A data content dealing center, which serves as a core of the system, comprises a data content database, an editing scenario database, a key management center, and a data content dealing management center present on a network.

The data content database stores the original data content provided by an information provider (IP) and supplies it in response to the request of the user.

The editing scenario database stores the editing scenario when the user obtained the edited data content by utilizing the original data content or user data content created by the user and supplies it in response to the request of the user.

The key management center stores a secret key for encryption/decryption for the original data content, the user data content and the editing scenario and supplies it in response to the request of the user.

A data content dealing management center prepares a catalog and advertises for the original data content or the edited data content and performs sales management and collecting a fee to the user, and also manages a copyright label of the data content to be stored in the data content database.

An editing scenario dealing management center prepares a catalog and advertises for the edited data content and performs sales management and collecting a fee to the user, and further, when necessary, collects and links the original data content according to the editing scenario and manages a label for the editing scenario to be stored in the editing scenario database For the detailed operation of each component, which comprises these data content dealing centers, description is not given here because it is the same as already explained.

(1) The information provider IPi (i=1, 2, 3, . . . ; the same applies hereinafter) encrypts the original data content M0$i$ using an original secret-key K0$i$:

$$Cm0iks0i=E(M0i,Ks0i),$$

encrypts the corresponding original secret-key Ks0$i$ using a public key Kbc of the data content dealing center:

$$Cks0ikbc=E(Ks0i,Kbc)$$

and supplies the encrypted original data content Cm0$iks$0$i$ (shown as "m0$i$" in the figure) and the encrypted original secret-key Cks0$ikbc$ (shown as "ks0$i$" in the figure) to the data content dealing center.

The original secret-key Ks0$i$ may be prepared by the information provider IPi, or the information provider IPi may ask the key management center to generate it. In case the key management center generates the original secret-key Ks0$i$, the generated original secret-key Ks0$i$ is encrypted using a public key Kb0$i$ of the information provider IPi:

$$Cks0ikb0i=E(Ks0i,Kb0i).$$

The encrypted original secret-key Cks0$ikb$0$i$ is distributed to the information provider IPi, who decrypts it using a private-key Kv0$i$:

$$Ks0i=D(Cks0ikb0i,Kv0i)$$

and the decrypted original secret-key Ks0$i$ is used for encryption of the original data content M0$i$.

The data content dealing center decrypts the supplied encrypted original secret-key Cks0$ikbc$ using a private-key Kvc of the data content dealing center:

$$Ks0i=D(Cks0ikbc,Kvc),$$

decrypts the encrypted original data content Cm0$iks$0$i$ using the decrypted original secret-key Ks0$i$:

$$M0i=D(Cm0iks0i,Ks0i)$$

and stores the decrypted original data content M0$i$ and the corresponding original secret-key Ks0$i$ in the data content database.

The information provider or the data content dealing center may add watermark to the original data content M0$i$ to check illegitimate use and may store it.

To promote utilization of the original data content, the data content dealing management center prepares a catalog by means to compress or to divide into parts so that the original data content cannot be utilized as it is and posts it in the data content dealing center.

(2) After reviewing the original data content prepared in catalog, a first user U1$i$ presents a first user label Lu1$i$ and a public key Kb1$i$ of the first user U1$i$, and by specifying the original data content to be utilized, requests for use to the data content dealing center.

(3) Upon receipt of the request for use of the original data content M0$i$, the data content dealing center confirms the user label Lu1$i$ to check for fee charging and identification, and then, encrypts the original data content M0$i$ using the corresponding original secret-key Ks0$i$:

$$Cm0iks0i=E(M0i,Ks0i),$$

encrypts the original secret-key Ks0$i$ using a public-key Kb1$i$ of the first user U1$i$:

$$Cks0ikb1i=E(Ks0i,Kb1i)$$

and distributes the encrypte original data content Cm0$iks$0$i$ and the encrypted original secret-key Cks0$ikb$1$i$ to the first user U1$i$, and also charges for the original data content utilization to the first user U1$i$.

(4) When the encrypted original data content Cm0$iks$0$i$ and the encrypted original secret-key Cks0$ikb$1$i$ have been distributed, the first user U1$i$ decrypts the encrypted original secret-key Cks0$ikb$1$i$ using a private-key Kv1$i$ of the first user U1$i$:

$$Ks0i=D(Cks0ikb1i,Kv1i),$$

decrypts the encrypted original data content Cm0$iks$0$i$ using the decrypted original secret-key Ks0$i$:

$$M0i=D(Cm0iks0i,Ks0i)$$

and creates a new first edited data content M1$i$ using the decrypted original data content M0$i$.

As described above, there are two cases to edit the data content: the case where a single original data content is used and the case where a plurality of original data contents are used. In these cases, the user's data content may be added. Therefore, as the data content to be used for edit in this embodiment, there are, in addition to a single data content, a plurality of original data contents, and user's data content. The edited data content comprises these data content and editing scenario, i.e. the details of editing. By obtaining these, it is possible to reproduce the edited data content.

Incidentally, the original data content is originally stored in the data content database of the data content dealing center. Accordingly, data which is not yet stored in the data content dealing center when newly generated by editing of the data content, is the user's data content and the editing scenario.

Therefore, by storing these in the data content dealing center, it is possible to handle the first user data content of the user who edited the data content in the same manner as the original data content, and the user can be also an information provider.

(5) The first edited data content M1$i$ comprises the original data content M0$i$ and a first editing scenario S1$i$. Further, in some cases, the first user data content Mu1$i$ is added as a comprising element.

Among these elements, the original data content M0$i$ is stored in the data content database of the data content dealing center. Accordingly, what is to be stored newly in the data content dealing center for executing secondary copyright of the first user includes the first editing scenario S1$i$ and the first user data content Mu1$i$.

For this purpose, the first user U1$i$ prepares a first secret-key Ks1$i$, encrypts the first editing scenario S1$i$ and the first user data content Mu1$i$ using the first secret-key Ks1$i$:

$$Cs1iks1i = W(S1i, Ks1i)$$

$$Cmu1iks1i = E(Mu1i, Ks1i),$$

encrypts the first secret-key Ks1$i$ using a public-key Kbc of the data content dealing center:

$$Cks1ikbc = E(Ks1i, Kbc)$$

and transfers the encrypted first editing scenario Cs1$iks$1$i$ (shown as "s1$i$" in the figure), the encrypted first user data content Cmu1$iks$1$i$ (shown as "m1$i$" in the figure), and the encrypted first secret-key Cks1$ikbc$ (shown as "ks1$i$" in the figure) to the data content dealing center.

The first secret-key Ks1$i$ may be prepared by the first user U1$i$, or the first user U1$i$ may ask the key management center to generate it. In case the key management center generates the first secret-key Ks1$i$, the first secret-key Ks1$i$ is encrypted using the public-key Kb1$i$ of the first user U1$i$:

$$Cks1ikb1i = E(Ks1i, Kb1i)$$

and the encrypted first secret-key Ck1$ikb$1$i$ is distributed to the first user U1$i$. The first user U1$i$ decrypts it using the private-key Kv1$i$:

$$Ks1i = D(Cks1ikb1i, Kv1i)$$

and the decrypted first secret-key K1$i$ is used to encrypt the first editing scenario S1$i$ and the first user data content Mu1$i$.

The data content dealing center decrypts the transferred encrypted first secret-key Cks1$ikbc$ using a private-key Kvc of the data content dealing center:

$$Ks1i = D(Cks1ikbc, Kvc)$$

decrypts the encrypted first editing scenario Cs1$iks$1$i$ and the encrypted first user data content Cmu1$iks$1$i$ using the decrypted first secret-key Ks1$i$:

$$S1i = D(Cs1iks1i, Ks1i)$$

$$Mu1i = D(Cmu1iks1i, Ks1i)$$

and generates a first user data content label and a first editing scenario label according to the first user label, and the decrypted first secret-key Ks1$i$, the first editing scenario S1$i$, the first user data content Mu1$i$, the first user data content label and the first editing scenario label are stored in the database.

The first user or the data content dealing center may add watermark to the original data content M0$i$ to check illegitimate use and may store it.

The database where the first secret-key Ks1$i$, the first editing scenario S1$i$ and the first user data content Mu1$i$ are to be stored may be the data content database where the original data content M0$i$ is stored, or another scenario database may be provided to store them.

To promote utilization of the first edited data content, the data content dealing management center prepares a catalog by means to compress or to divide into parts so that the first edited data content cannot be utilized as it is and posts it in the data content dealing center.

(6) After reviewing the original data content M0$i$ and the first edited data content M1$i$ prepared in catalog, a second user U2$i$ presents a second user label Lu2$i$ and a public-key Kb2$i$ of the second user U2$i$. By specifying the original data content M0$i$ and/or the first edited data content M1$i$ to be utilized, a request for use is sent to the data content dealing center.

(7) Upon receipt of the request for use of the original data content M0$i$ and/or the first edited data content M1$i$, the data content dealing center confirms the user label Lu2$i$ to check for fee charging and identification. Then, the original data content M0$i$ requested for use, is encrypted using the corresponding original secret-key Ks0$i$. The first editing scenario S1$i$ and the first user data content Mu1$i$ are encrypted using the first secret-key Ks1$i$, the original secret-key Ks0$i$ is encrypted using a public-key Kb2$i$, and the first secret-key Ks1$i$ is encrypted using the public-key Kb2$i$:

$$Cm0iks0i = E(M0i, Ks0i)$$

$$Cs1iks1i = E(S1i, Ks1i)$$

$$Cmu1iks1i = E(Mu1i, Ks1i)$$

$$Cks0ikb2i = E(Ks0i, Kb2i)$$

$$Cks1ikb2i = E(Ks1i, Kb2i).$$

Then, the encrypted original data content Cm0$iks$0$i$ (shown as "m0$i$" in the figure), the encrypted first editing scenario Cs1$iks$1$i$ (shown as "s1$i$" in the figure), the encrypted first user data content Cmu1$iks$1$i$ (shown as "mu1$i$" in the figure), the encrypted original secret-key Cks0$ikb$2$i$ and the encrypted first secret-key Cks1$ikb$2$i$ are transferred to the second user U2$i$. And then, the data content dealing center charges for utilization of the original data content M0$i$ and the first editing scenario S1$i$ to the second user U2$i$.

(8) When the encrypted original data content Cm0$iks$0$i$, the encrypted first editing scenario Cs1$iks$1$i$, the encrypted first user data content Cmu1$iks$1$i$, the encrypted original secret-key Cks01$kb$2$i$ and the encrypted first secret-key Cks1$ikb$2$i$ have been transferred, the second user U2$i$ decrypts the encrypted original secret-key Cks0$ikb$2$i$ and the encrypted first secret-key Cks1$ikb$2$i$ using a private-key Kv2$i$ of the second user U2$i$:

$$Ks0i = D(Cks0ikb2i, Kv2i)$$

$$Ks1i = D(Cks1ikb2i, Kv1i).$$

Next, the encrypted original data content Cm0$iks$0$i$ is decrypted using the decrypted original secret-key Ks0$i$, and the encrypted first editing scenario Cs1$iks$1$i$ and the encrypted first user data content Cmu1$iks$1$i$ are decrypted using the decrypted first secret-key Ks1$i$:

$$M0i = D(Cm0iks0i, Ks0i)$$

$$S1i = D(Cs1iks1i, Ks1i)$$

$$Mu1i = D(Cmu1iks1i, Ks1i)$$

and a new second edited data content M2$i$ is created by utilizing the decrypted original data content M0$i$, the first editing scenario S1$i$ and the first user data content Mu1$i$.

The second user U2$i$ prepares a second secret-key Ks2$i$ and encrypts a new second editing scenario S2$i$ and a second user data content Mu2$i$, not stored in the database of the data content dealing center, using the second secret-key Ks2$i$:

$$Cs2iks2i = E(S2i, Ks2i)$$

$$Cmu2iks2i = E(Mu2i, Ks2i).$$

Then, the second secret-key Ks2$i$ is encrypted using the public-key Kbc of the data content dealing center:

$$Cks2ikbc = E(Ks2i, Kbc)$$

and the encrypted second editing scenario Cs2$iks$2$i$ (shown as "s2$i$" in the figure), the encrypted second user data content Cmu2$iks$2$i$ (shown as "mu2$i$" in the figure), and the encrypted second secret-key Cks2$ikbc$ (shown as "ks2$i$" in the figure) are transferred to the data content dealing center Then, the same procedure is repeated.

Embodiment 6

Description is given on this embodiment in which a data content editor sells a utilization right of an editing scenario by auction in the data content market, referring to FIG. 7. In the embodiment, the utilization right of an editing scenario is auctioned on the market in the system, and an editing scenario seller who obtains the utilization right of the editing scenario sells or lends the editing scenario to a user.

The original data content handled in the present system is an object, and the edited data content is expressed as the original data content object linked by the editing scenario. Therefore, only the editing scenario is dealt in. When the editing scenario has been purchased or lent, the user collects and links the original data content used in accordance with the editing scenario and reproduces the edited data content. In this case, the original data content may be collected by the user himself, but the burden on the user may be reduced if it is performed in the system side or by using an agent program.

A data content dealing center, which serves as a core of the system, comprises a key management center, a data content database, a data content dealing management center, an editing scenario database, and an editing scenario market management center present on the network.

The data content database stores the original data content provided by an information provider (IP) and supplies it to a data content editor.

The editing scenario database stores the editing scenario when the data content editor obtains the edited data content by utilizing the original data content or the editor's data content created by the data content editor and supplies it to the editing scenario sellers, who participate in auction.

The key management center stores a secret-key for encryption/decryption for the original data content, the editor's data content and the editing scenario and supplies it to the data content editor or the editing scenario seller.

The data content dealing management center prepares a catalog and advertises for the original data content and manages sales for the data content editor.

The editing scenario market management center prepares a catalog and advertises for the edited data content, and manages editing scenario auction and collects a fee. Further, the editing scenario market management center collects and links the original data content according to the editing scenario, when necessary, and also manages a lbel for the editing scenario which is to be stored in the editing scenario database.

For the detailed operation of each component, which comprises the data content dealing center, description is not given here because it is the same as already explained.

(1) The information provider IPi (i=1, 2, 3, . . . ; the same applies hereinafter) encrypts the original data content M0$i$ using an original secret-key K0$i$:

$$Cm0iks0i = E(M0i, Ks0i),$$

encrypts the corresponding original secret-key Ks0$i$ using a public-key Kbc of the data content dealing center:

$$Cks0ikbc = E(Ks0i, Kbc)$$

and supplies the encrypted original data content Cm0$iks$0$i$ (shown as "m0$i$" in the figure) and the encrypted original secret-key Cks0$ikbc$ (shown as "ks0$i$" in the figure) to the data content dealing center.

The original secret-key Ks0$i$ may be prepared by the information provider IPi, or the information provider IPi may ask the key management center to generate it. In case the key management center generates the original secret-key Ks0$i$, the generated original secret-key Ks0$i$ is encrypted using a public-key Kb0$i$ of the information provider IPi:

$$Cks0ikb0i = E(Ks0i, Kb0i).$$

The encrypted original secret-key Cks0$ikb$0$i$ is distributed to the information provider IPi, and is decrypted using a private-key Kv0$i$ of the IP:

$$Ks0i = D(Cks0ikb0i, Kv0i)$$

and the decrypted original secret-key Ks0$i$ is used for encryption of the original data content M0$i$.

The data content dealing center decrypts the supplied encrypted original secret-key Cks0$ikbc$ using a private-key Kvc of the data content dealing center:

$$Ks0i = D(Cks0ikbc, Kvc),$$

decrypts the encrypted original data content Cm0$iks$0$i$ using the decrypted original secret-key Ks0$i$:

$$M0i = D(Cm0iks0i, Ks0i)$$

and stores the decrypted original data content M0$i$ and the corresponding original secret-key Ks0$i$ to the data content database.

The information provider or the data content dealing center may add watermark to the original data content M0$i$ to check illegitimate use and may store it.

To promote utilization for editing of the original data content, the data content dealing management center prepares a catalog by means to compress or to divide into parts so that the original data content cannot be utilized as it is and posts it in the data content dealing center.

(2) After reviewing the original data content, the data content editor Ei presents a data content editor label Lei and a public-key Kb1$i$ of the data content editor E$i$, and requests for utilization by specifying the original data content to be utilized, to the data content dealing center.

(3) Upon receipt of the request for utilization of the original data content M0$i$, the data content dealing center confirms the user label Le$i$ to check for fee charging and identification. Then, the original data content M0$i$ is encrypted using the corresponding original secret-key Ks0$i$:

$$Cm0iks0i=E(M0i,Ks0i),$$

encrypts the original secret-key Ks0$i$ using a public-key Kbe$i$ of the data content editor E$i$:

$$Cks0ikbei=E(Ks0i,Kbei)$$

and distributes the encrypted original data content Cm0$iks$0$i$ and the encrypted original secret-key Cks0$ikbei$ to the data content editor E$i$, and further, charges a fee for the original data content utilization to the data content editor E$i$ and an end user.

(4) When the encrypted original data content Cm0$iks$0$i$ and the encrypted original secret-key Cks0$ikbei$ have been distributed, the data content editor E$i$ decrypts the encrypted original secret-key Cks0$ikbei$ using a private-key Kve$i$ of the data content editor E$i$:

$$Ks0i=E(Cks0ikbei,Kvei),$$

decrypts the encrypted original data content Cm0$iks$0$i$ using the decrypted original secret-key Ks0$i$:

$$M0i=D(Cm0iks0i,Ks0i)$$

and creates an edited data content Me$i$ utilizing the decrypted original data content M0$i$.

As described above, there are two cases to edit the data content: the case where a single original data content is used and the case where a plurality of original data contents are used. In these cases, the data content of the data content editor may be added. Therefore, as the data content to be used for editing in this embodiment, there are, in addition to a single data content, a plurality of original data contents and the data content of the data content editor. The edited data content comprises the data content and the editing scenario, i.e. the detail of editing. By obtaining these, it is possible to reproduce the edited data content.

Incidentally, the original data content is originally stored in the data content database of the data content dealing center. Accordingly, data which is not yet stored in the data content dealing center when newly generated by editing the data content, is the editor's data content of the data content editor and the editing scenario.

Therefore, by storing these in the data content dealing center, it is possible to handle the editor's data content of the data content editor who has edited the data content in the same manner as the original data content, and the data content editor can be an information provider. Further, it is also possible to sell utilization right of the editing scenario and/or the editor's data content by auction in the market. In this case, the utilization right of the editing scenario and the editor's data content may be plural for a single edited data content.

(5) The edited data content Me$i$ comprises the original data content M0$i$ and the editing scenario Se$i$. Further, in some cases, the editor's data content is added as a comprising element.

Among these elements, the original data content M0$i$ is stored in the data content database of the data content dealing center. Accordingly, what is to be stored newly in the data content dealing center is the editing scenario S1$i$ and the editor's data content Med$i$.

To sell the utilization right of the editing scenario S1$i$ and the editor's data content Med$i$, the data content editor E$i$ prepares a secret-key Kse$i$, encrypts the editing scenario Se$i$ and the editor's data content Med$i$ using the secret-key Kse$i$:

$$Cseiksei=E(Sei,Ksei)$$

$$Smediksei=E(Medi,Ksei)$$

and encrypts the secret-key Kse$i$ using the public-key Kbc of the data content dealing center:

$$Ckseikbc=E(Ksei,Kbc).$$

Then, the encrypted editing scenario Cseikse$i$ (shown as "se$i$" in the figure), the encrypted editor's data content Cmeikse$i$ (shown as "me$i$" in the figure), and the encrypted secret-key Ckseikbc (shown as "kse$i$" in the figure) are transferred to the data content dealing center.

The secret-key Kse$i$ may be prepared by the data content editor E$i$, or the data content editor E$i$ may ask the key management center to generate it. In case the key management center generates the secret-key Kse$i$, the generated secret-key Kse$i$ is encrypted using the public-key Kbe$i$ of the data content editor E$i$:

$$Ckseikbei=E(Ksei,Kbei)$$

and the encrypted secret-key Ckseikbe$i$ is distributed to the data content editor E$i$. The data content editor E$i$ decrypts it using own private-key Kve$i$:

$$Ksei=D(Ckseikbei,Kvei)$$

and the decrypted secret-key Kse$i$ is used to encrypt the editing scenario Se$i$ and the data content editor's data content Med$i$.

The data content dealing center decrypts the transferred encrypted secret-key Ckseikbc using the private-key Kvc of the data content dealing center:

$$Ksei=D(Ckseikbc,Kvc).$$

Then, the encrypted editing scenario Cseikse$i$ and the encrypted editor's data content Cmedikse$i$ are decrypted using the decrypted secret-key Kse$i$:

$$Sei=D(Cseiksei,Ksei)$$

$$Medi=D(Cmediksei,Ksei).$$

Then, a copyright label based on the data content editor label Le$i$ is added to each of the decrypted secret-key Kse$i$, the editing scenario Se$i$ and the editor's data content Med$i$, and these are stored in the database.

The data content editor or the data content dealing center may add watermark to the editing scenario Se$i$ and the editor's data content Med$i$ to check illegitimate use and may store them.

The database where the secret-key Kse$i$, the editing scenario Se$i$ and the editor's data content Med$i$ are to be stored may be the data content database where the original data content M0$i$ is stored, or another scenario database may be provided to store them.

For auction of the editing scenario and the editor's data content, the editing scenario market management center in the data content dealing center prepares a catalog by means to compress or to divide into parts so that the edited data content cannot be utilized as it is and posts it shown number of the selling utilization rights in the editing scenario market management center to announce the auction.

(6) After reviewing the edited data content Mei prepared in catalog, each of a plurality of editing scenario sellers Di presents an editing scenario seller label Ldi and a public-key Kbdi of the editing scenario seller Di and requests to purchase the editing scenario Sei and the editor's data content Medi to the editing scenario market management center.

(7) Upon receipt of the request to purchase the editing scenario Sei and the editor's data content Medi, the editing scenario market management center confirms the editing scenario seller label Ldi to check for fee charging and identification, performs the auction in the market, and sells the utilization right of the editing scenario Sei and the editor's data content Medi to a plurality of editing scenario sellers Di.

As described above, the utilization right of the editing scenario and the editor's data content may be plural for a single edited data content.

The editing scenario seller Di, to whom it has been decided to sell, encrypts the secret-key Ksdi of the editing scenario seller Di using the public-key Kbc of the data content dealing center:

$$Cksdikbc=E(Ksdi,Kbc)$$

and transfers the encrypted secret-key Cksdikbc (shown as ksdi in the figure) to the editing scenario market management center.

(8) The editing scenario market management center decrypts the presented encrypted secret-key Cksdikbc using the private-key Kvc of the data content dealing center:

$$Ksdi=D(Cksdikbc,Kvc)$$

encrypts the editing scenario Sei and the editor's data content Medi using the decrypted secret-key Ksdi of the editing scenario seller Di:

$$Cseiksdi=E(Sei,Ksdi)$$

$$Cmediksdi=E(Medi,Ksdi)$$

and sends the encrypted editing scenario Cseiksdi and encrypted editor's data content Cmediksdi to the editing scenario seller Di.

Also, the content of the copyright label is changed from the one based on the data content editor label Lei to the one based on the editing scenario seller label Ldi. As a result, the secret-key Ksei of the data content editor cannot be used any more, and the secret-key Ksdi of the editing scenario seller can be used substantially. In this case, instead of changing the content of the copyright label, it may be newly added based on the editing scenario seller label Ldi.

The editing scenario seller who purchases the encrypted editing scenario Cseiksdi executes thereafter the utilization right of the purchased editing scenario. The original data content can also be sold by auction in the same manner as the editing scenario. However, it is preferable to avoid to sell to a specific seller because there may be a plurality of users utilizing the original data content.

Then, the same procedure may be repeated if necessary.

In the data content dealing system described in each embodiment of the present application, in case that for a user device, a network computer without a storing unit such as a hard disk drive is used, the illegitimate use, i.e., using without pay or leakage of the data content hardly occurs. However, in case that for a user device, a general computer having a storing unit such as a hard disk drive is used, there is a possibility of problems such like these illegitimate use.

To cope with such problems, adopting a copyright management program and re-encryption of the data content is effective as the present inventor has proposed in the U.S. patent application Ser. No. 08/416,037 (EP 677949A2), and if adopting an arrangement referred to as a real-time OS or an embedded system which allows the copyright management program performing re-encryption to precede other application programs, the illegitimate use problems can be effectively avoided.

It is understood that particular embodiments described herein are illustrative and the present invention is not limited to these particular embodiments. It will be apparent to those skilled in the art that changes can be made in the various details described herein without departing from the scope of the invention. The present invention is defined by the claims and their full scope of equivalents.

What is claimed is:

1. A method for dealing in data content using a data content dealing system, in which an original data content and an edited data content which a first user has edited are sold in a network to a second user, whereby:

said original data content comprises a data object;

said edited data content comprises said data object and an editing scenario describing editing details of said data object;

said data content dealing system comprises a data content dealing center and a database;

said data content dealing center comprises a key management center, a data content dealing management center and an editing scenario dealing management center;

said method comprising the steps of:

said key management center generating a secret-key, storing said secret-key and transferring of said secret-key;

said data content dealing management center advertising and selling said data content stored in said database;

said editing scenario dealing management center advertising and selling said editing scenario;

said first user creating said edited data content by utilizing said original data content stored in said database, encrypting an editing scenario of said edited data content by a secret-key which is to be deposited in said database, and depositing said secret-key to said key management center;

transferring said encrypted editing scenario and said secret-key to the second user who wishes to utilize said edited data content;

said second user decrypting said encrypted editing scenario by said secret-key and re-constituting said edited data content according to said decrypted editing scenario.

2. The method of claim 1, wherein said database comprises a data content database storing a data content and an editing scenario database storing an editing scenario.

3. The method of claim 1, wherein said step of transferring said encrypted editing scenario and said secret key to said second user comprises transferring said original data content to said second user together with said encrypted editing scenario and said secret-key.

4. A method of dealing in data content using a data content dealing system, in which a utilization right of an editing scenario of an edited data content which comprises an original data content edited by a data content editor is auctioned in a network to an editing scenario seller, whereby:

said original data content comprises a data object;

said edited data content comprises said data object and the editing scenario describing editing details of said data object;

said data content dealing system comprises a data content dealing center and a database;

said data content dealing center comprises a key management center, a data content dealing management center and an editing scenario market management center;

said method comprising the steps of:

said key management center generating a secret-key, storing said secret-key and transferring said secret-key;

said data content dealing management center advertising and selling said original data content stored in said database;

said editing scenario market management center advertising and auctioning said editing scenario;

said data content editor producing the edited data content by utilizing said original data content stored in said database, encrypting the editing scenario of said edited data content by a secret-key of said data content editor, depositing said encrypted editing scenario of said edited data contend to said database and depositing said secret-key with said key management center;

auctioning said utilization right of said editing scenario to said editing scenario seller who wishes to sell said utilization right of said editing scenario;

said editing scenario seller transferring a secret-key for said editing scenario to said key management center;

said editing scenario market management center changing said secret-key for said editing scenario from the secret-key of said data content editor to the secret-key of said editing scenario seller.

* * * * *

UNITED STATES PATENT AND TRADEMARK OFFICE
CERTIFICATE OF CORRECTION

PATENT NO.:   6,076,077
DATED     :   June 13, 2000
INVENTOR(S):  Makoto SAITO

It is certified that an error appears in the above-identified patent and that said Letters Patent is hereby corrected as shown below:

On the title page of patent in item [22] change, "Filed: May 1, 1997" to be -- Filed April 29, 1997--

Signed and Sealed this

Seventeenth Day of April, 2001

*Attest:*

NICHOLAS P. GODICI

*Attesting Officer*     *Acting Director of the United States Patent and Trademark Office*